(12) United States Patent
Baker et al.

(10) Patent No.: US 10,982,931 B2
(45) Date of Patent: Apr. 20, 2021

(54) VISUAL TARGETING APPARATUS AND SYSTEM

(71) Applicant: Umarex USA, Inc., Fort Smith, AR (US)

(72) Inventors: Jacob Baker, Sheridan, IL (US); John Baker, Sheridan, IL (US)

(*) Notice: Subject to any disclaimer, the term of this patent is extended or adjusted under 35 U.S.C. 154(b) by 0 days.

(21) Appl. No.: 15/064,841

(22) Filed: Mar. 9, 2016

(65) Prior Publication Data
US 2016/0266372 A1 Sep. 15, 2016

Related U.S. Application Data

(60) Provisional application No. 62/130,091, filed on Mar. 9, 2015, provisional application No. 62/187,340, filed on Jul. 1, 2015.

(51) Int. Cl.
| | | |
|---|---|---|
| G02B 3/02 | (2006.01) | |
| G02B 7/02 | (2021.01) | |
| F41G 1/54 | (2006.01) | |
| G02B 23/14 | (2006.01) | |
| G02B 23/10 | (2006.01) | |
| G02B 7/14 | (2021.01) | |
| G02B 27/36 | (2006.01) | |
| F41G 1/38 | (2006.01) | |

(52) U.S. Cl.
CPC .............. *F41G 1/545* (2013.01); *G02B 7/14* (2013.01); *G02B 23/10* (2013.01); *G02B 23/14* (2013.01); *G02B 27/36* (2013.01); *F41G 1/38* (2013.01)

(58) Field of Classification Search
CPC ... F41G 1/38; F41G 1/30; F41G 1/345; F41G 1/00; F41G 1/393; F41G 1/41; G02B 25/001; G02B 23/14
USPC .......................... 359/565–576, 643–647, 742
See application file for complete search history.

(56) References Cited

U.S. PATENT DOCUMENTS

| | | | |
|---|---|---|---|
| 944,916 A | 12/1909 | Shepard | |
| 2,007,019 A | 7/1935 | Lowe | |
| 3,512,892 A * | 5/1970 | Jorris | ........................ F41G 1/54 356/153 |
| 7,313,885 B1 | 1/2008 | Looney | |
| 7,827,723 B1 * | 11/2010 | Zaderey | .................... F41G 1/38 42/122 |
| 9,417,034 B1 * | 8/2016 | Swan | .................... F41G 11/008 |
| 2003/0074824 A1 | 4/2003 | Arachequesne | |
| 2006/0109544 A1 * | 5/2006 | Greenslade | ................ F41G 1/32 359/353 |
| 2010/0238554 A1 * | 9/2010 | Crandall | .................... F41G 1/01 359/565 |
| 2011/0099881 A1 * | 5/2011 | Jung | ......................... F41G 1/38 42/113 |
| 2011/0296731 A1 * | 12/2011 | Carlson | ................. F41G 11/001 42/90 |

(Continued)

*Primary Examiner* — Mahidere S Sahle
(74) *Attorney, Agent, or Firm* — Mark A. Pitchford; Eric B. Fugett; Pitchford Fugett, PLLC (57) ABSTRACT

A target adjustment apparatus may be provided. The target adjustment apparatus may include an optical targeting device having a first zero. The target adjustment apparatus may further include an optical adjustment lens removably disposed in a line of sight between a target and the optical targeting device. The optical adjustment lens may shift a target image before it reaches the optical targeting device, creating a second zero.

15 Claims, 11 Drawing Sheets

(56) References Cited

U.S. PATENT DOCUMENTS

| | | | | |
|---|---|---|---|---|
| 2012/0192478 A1* | 8/2012 | Jahromi | ............. | F41G 1/38 |
| | | | | 42/122 |
| 2012/0311912 A1* | 12/2012 | Howe | ............. | F41G 1/01 |
| | | | | 42/111 |
| 2016/0018188 A1* | 1/2016 | Jahromi | ............. | F41G 1/38 |
| | | | | 359/428 |
| 2018/0172404 A1* | 6/2018 | Kleck | ............. | F41G 3/08 |

* cited by examiner

VISUAL TARGETING APPARATUS AND SYSTEM

PRIORITY CLAIM

This application claims priority to U.S. Provisional Application No. 62/130,091, filed Mar. 9, 2015, and U.S. Provisional Application No. 62/187,340, filed Jul. 1, 2015, the contents of which are herein incorporated by reference.

BACKGROUND

Many modern shooting accessories, such as scopes or sights, may be attached to a variety of firearms, generally to improve the functionality or usability of those firearms. Known accessories include scopes, holographic sights, red dot sights, and reflex sights. These accessories may be used wherever firearms or similar weapons may be employed, such as for hunting, law enforcement, military, personal defense, recreational target shooting, paint ball, air soft, pellet and any projectile air driven round. Mounts, such as ring mounts, quick release bases, bolt on bases, and magnetic bases are used to couple an accessory to a weapon. For example, a gun may have a scope mount on its action, which may permit an after-market scope to be attached to the gun after it has been purchased. This may improve the user's ability to operate the gun, for example by making it easier for the user to aim the gun at long-distance targets.

Other devices may similarly incorporate scopes. Many hunters, for example, choose to hunt with modernized crossbows; these weapons may also include mounting sites for a scope, or may be sold with a scope pre-mounted to the stock. Scoped devices also may not exclusively be weapons; many cameras, telescopes, and other optical sensing devices may include view finding scopes that may allow a user to align the device.

These devices, however, may have functional and practical problems. Most scopes or targeting devices have a finite range. Insufficient adjustability in elevation may reduce or, in some cases, eliminate the ability of a platform/weapon to be employed over its full potential range. Adjustability in elevation may relate to the ability to use the scope/weapon over a known range/yardage/meters/distance. Current optical devices do not match the range of high performance rounds like the .50 cal, .375, .408, .409, 25 mm, and other rounds as would be understood by a person having ordinary skill in the art. These weapons platforms are currently either limited to shorter distances or very specific ranges (example 2400 meters to 3000 meters) at long range. This may be through methods such as "terrain bracketing" in which objects beyond the target or vertical from the target are used to create a reference in order to target an object beyond the range of the base optics. In Close Quarter (CQ) devices this could be 300 meters, while in other engagements, limits could start taking place at 2400 meters. Still other ranges, such as air soft or paint ball range limits of 50 meters might take place. Other devices might have a limited reference aim point/dot/reticle that only allows a single distance to be used without operator compensation or guess work. Additionally, it is often time consuming or difficult to change devices for close quarters or long range targeting. It can also be confusing for a person in to make such compensation in the field, under duress. Mistakes are made while switching ranges. Mistakes could include the bullet not arriving on the intended target, a loss of points in a target shooting match, or, in other cases, the mistake can cost lives.

SUMMARY

According to an exemplary embodiment, a target adjustment apparatus may be provided. The target adjustment apparatus may include an optical targeting device having a first zero. The target adjustment apparatus may further include an optical adjustment lens removably disposed in a line of sight between a target and the optical targeting device. The optical adjustment lens may shift a target image before it reaches the optical targeting device, creating a second zero.

According to another exemplary embodiment, a method of creating a second zero for an optical targeting device may be provided. The method may include providing an optical adjustment lens in a line of sight between a target and an optical targeting device. The optical adjustment lens may shift the target image, which is to be viewed through the optical targeting device.

BRIEF DESCRIPTION OF THE FIGURES

Advantages of embodiments of the present invention will be apparent from the following detailed description of the exemplary embodiments thereof, which description should be considered in conjunction with the accompanying drawings in which like numerals indicate like elements, in which.

DETAILED DESCRIPTION OF THE EMBODIMENTS

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description discussion of several terms used herein follows.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation.

Referring generally to the figures, exemplary embodiments of a visual aid may be shown and described. The visual aid may be a scope or other such device that is mounted on a weapon, such as a rifle, that can allow a user to more accurately acquire, view, range, and shoot targets. Such a scope may be such that, by implementing further components, its effective range may be substantially increased, for example about 200% or more. The visual aid described in exemplary embodiments herein may be such that it can add or subtract distance capabilities to or from any desired optical system and may be used or applied on or with respect to any shooting platform, or with respect to any rail or mounts. Further the device may be utilized without additional tools or without negatively impacting or adjusting existing optics.

In one exemplary embodiment, and generally referring to the figures, a method, system, and apparatus for adjusting a scope may be described. The method, system, and apparatus may be a mechanical, optical adjustment with kinetics. The optical adjustments may effectively apply a second zero to an optical system.

An optical adjustment device may allow for changing a target's apparent position, for example as viewed by a user or operator. This may create a second zero. The device may change the apparent position of an image before reaching a scope, red dot, ACOG, iron sights, or the like, by changing an incoming image's optical path within a lens. It may be appreciated that the lens may be any type of lens, for example glass, plastic, crystal, fused silica, sapphire, a prism, or any other material or substance that is transparent to target wavelengths or operating systems. In another exemplary embodiment, the lens may be able to change an apparent position of an image, or second zero, by internal or external reflection. The device may further be employed in visible spectrum optics, low light level devices (night optics), and filtration and enhanced image devices. The device may be capable of compensating for various velocity components of ammunition or projectiles, such as subsonic, round and/or barrel changes, atmosphere, elevation and any other ballistic compensation that may affect the vertical adjustment of an optical device, as would be understood by a person having ordinary skill in the art.

Using an optical adjustment device or lens may create a great and/or more precise operating range that could be applied to a larger variety of aiming devices. The device may create a second zero at ranges other than the initial zero provided by the base aiming device. Such devices can include, but are not limited to, scopes, laser targeting devices, holographic devices, red dots, mechanical devices, and the like. The device can further be applied in layers and/or steps that can allow for stepped changes up or down in apparent shift in either or both of x and y axes (i.e. vertically and/or horizontally). For example, the device may be adjusted to provide small variations, as desired by a user, to improve sighting or targeting. Such adjustments may allow for the adjusting of the zero of a rifle or reticle in any horizontal (x) or vertical (y) direction, or any combination thereof. It may further be appreciated that the zero of a rifle can be adjusted in any desired various distance increments through the addition or subtraction of lenses in the exemplary embodiments described herein. Such additions or subtractions may be made manually or automatically. For example, some exemplary embodiments may allow for a user to add or remove lenses from a device; still other exemplary embodiments may allow devices with different lenses and/or capabilities to be easily swapped or replaced. Further, it may be appreciated that certain lenses may be made and utilized in exemplary embodiments of the devices described herein that may compensate for, and provide a desired adjusted image, for a specific bullet or round, and the ballistics of that bullet or round.

Figure 1:
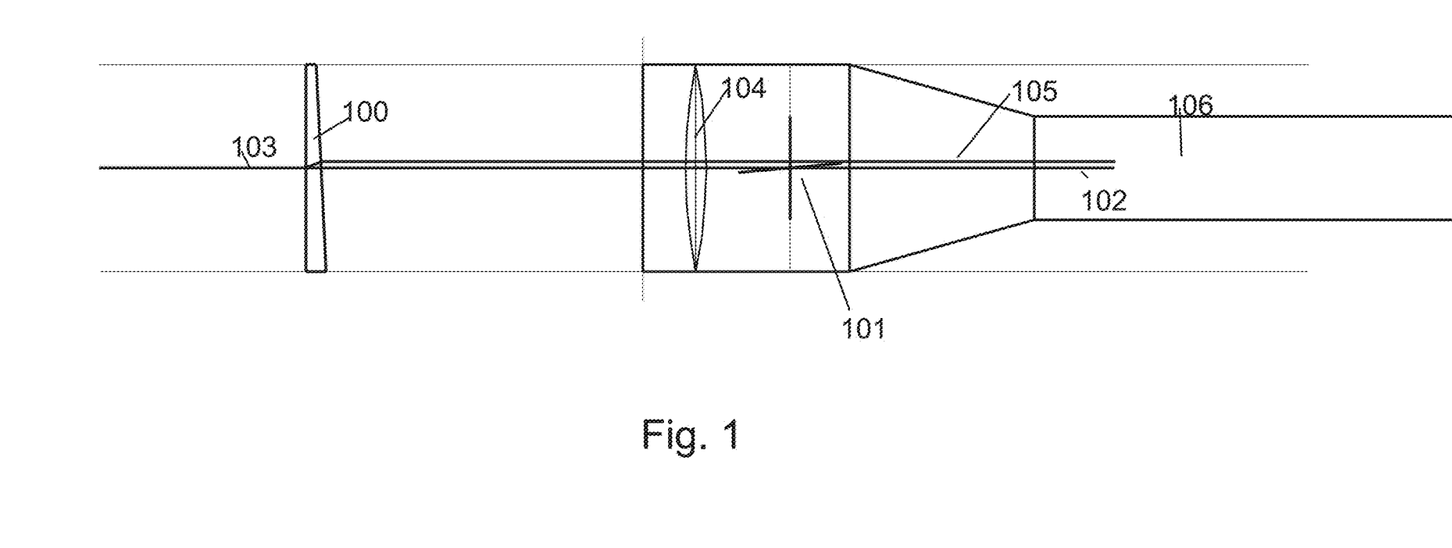
FIG. 1 is an exemplary diagram of a visual targeting device and system.

Referring now to FIG. 1, an exemplary embodiment of an optical adjustment device 100 may be shown. In this example, an image or target position 103 may be shifted before entering an existing optics device 106, such as a scope, reticle, or the like, or any other aiming device 100. Here, an original image, primary zero, or first zero may be in position 102. The existing optics device 106 may include a prism or light bending body 104 and a crosshair, reticle or dot marking an aiming point 101. An optical adjustment device 100 may include a prism or light bending body and may be coupled with existing optics or components 106. Thus, when the original image passes through the combined prism 100 and existing optics 106, the shifted image 105 may create a second zero, as desired.

Figure 2:
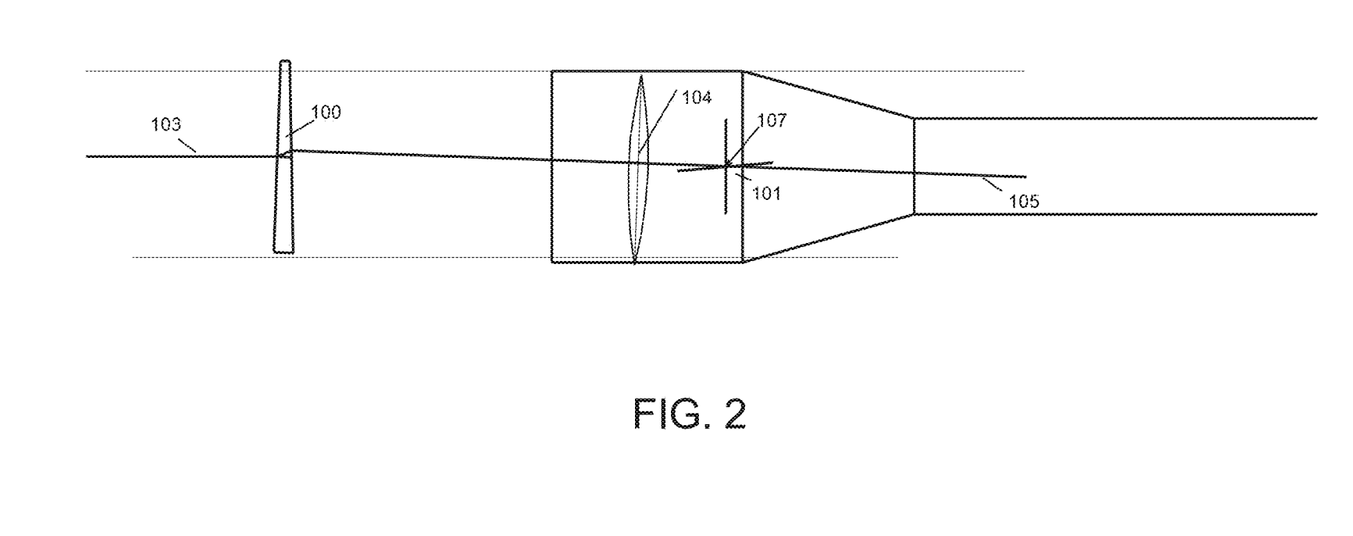
FIG. 2 is another exemplary diagram of a visual targeting device and system.

In exemplary FIG. 2, a setup as substantially shown in exemplary FIG. 1 may be shown. A target image 103 may pass through an optical adjustment device 100, which may create a shifted image 105, which may subsequently pass through an existing optical device 106. Further, in exemplary FIG. 2, it may be appreciated that the viewer using device 100 may shift the weapon, mechanism, or other platform to which device 100 may be coupled in order to realign the shifted image 105 to a desired aiming point 107.

Figure 3:
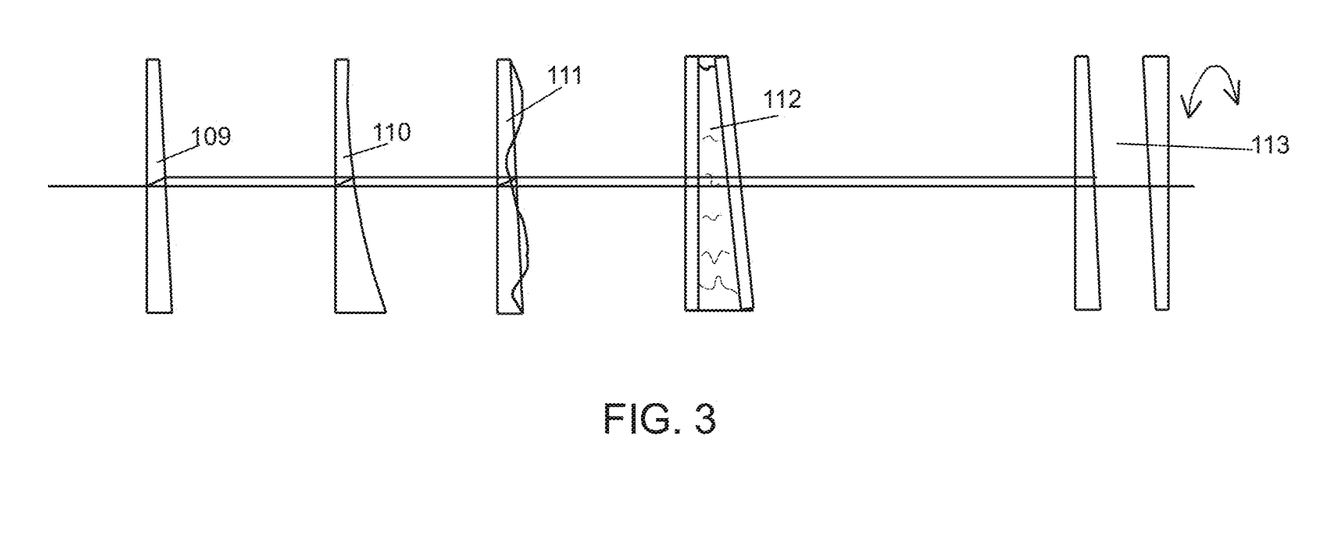
FIG. 3 is an exemplary diagram of components of a visual targeting device and system.

In exemplary FIG. 3, further components, which may be used in various embodiments of optical adjustment device 100 may be shown and may be utilized, as desired. Here, device 100 may optionally include prism 109, cylinder lens 110, flexible surface 111, and a rigid surface 113 or surface filled with oil, gel, or any solution or combination thereof 112 may further be utilized, as would be understood by a person having ordinary skill in the art.

Figure 4:
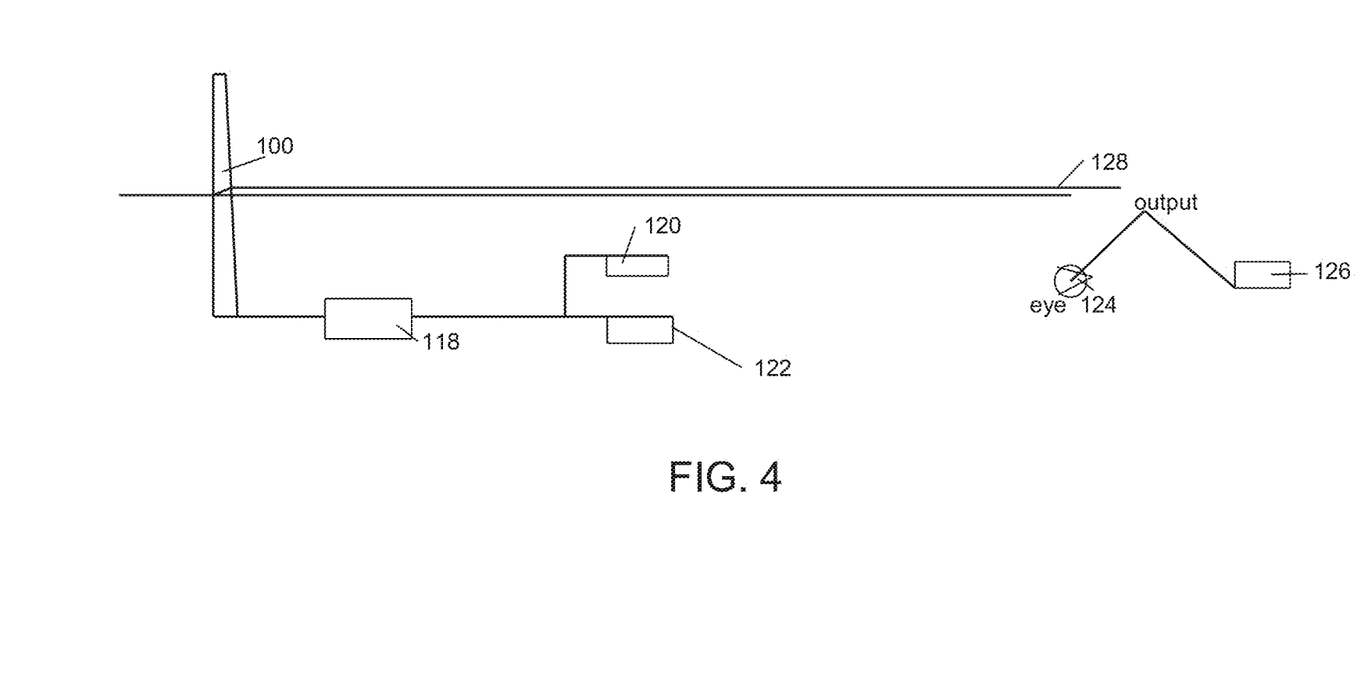
FIG. 4 is another exemplary diagram of components of a visual targeting device and system.

Next, in exemplary FIG. 4, it may be appreciated that device 100 may be mounted to any platform or weapon in any desired or known fashion. Here, it may further be appreciated that device 100 may be a standalone device or may be associated with an existing aiming system or scope. Additionally, device 100 may be actuated in any manual or automatic manner, for example with motor 118. Then, using range finder 120 and ballistic computer or calculator 122 (or the like) to drive an output image 128 that is shifted may be obtained. The output image 128 may be determined and situated base on eye information 124, or information interpreted by a viewer, as well as data 126 collected from ballistic computer 122.

Figure 5:
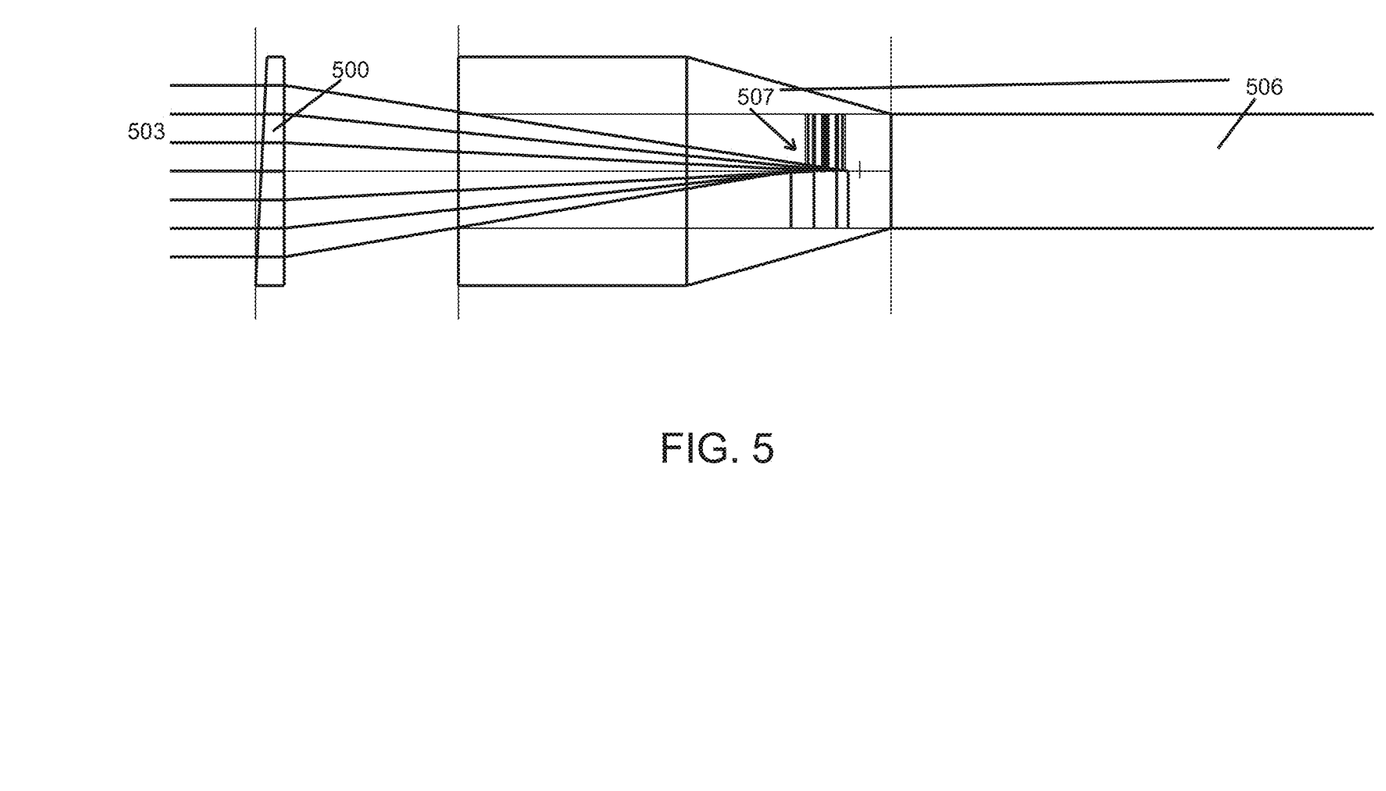
FIG. 5 is an exemplary diagram showing an optical image adjustment.
Figure 6:
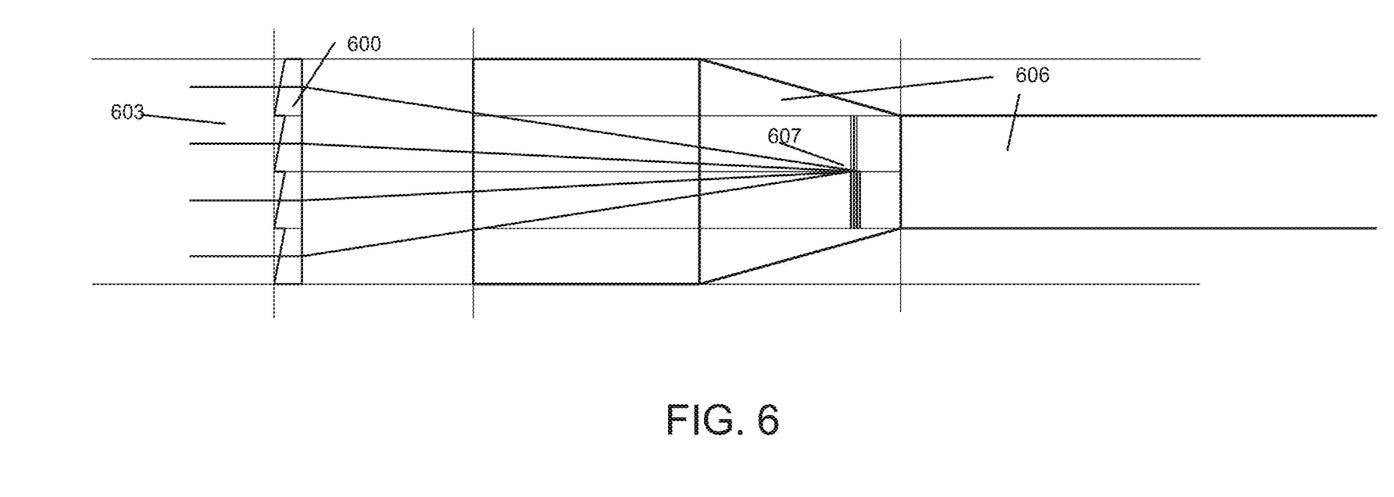
FIG. 6 is another exemplary diagram showing an optical image adjustment.
Figure 7:
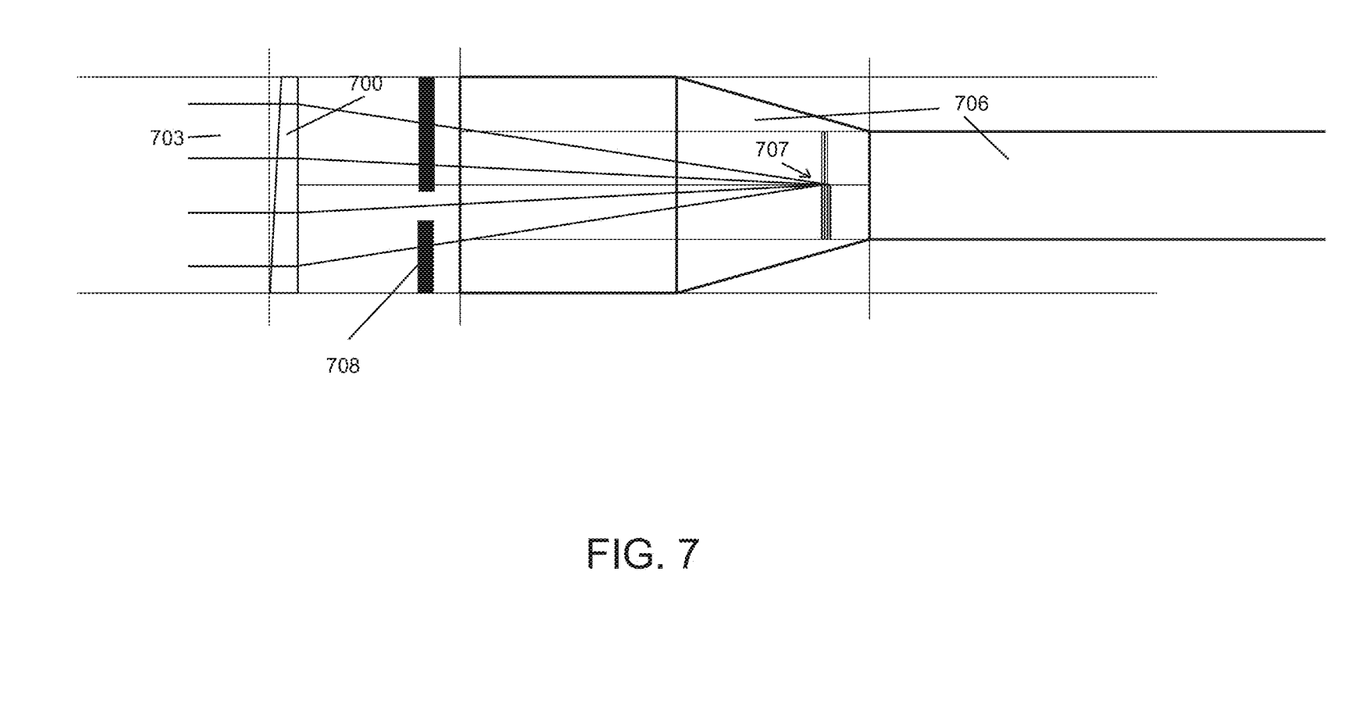
FIG. 7 is an exemplary diagram showing an optical image adjustment.
Figure 8:
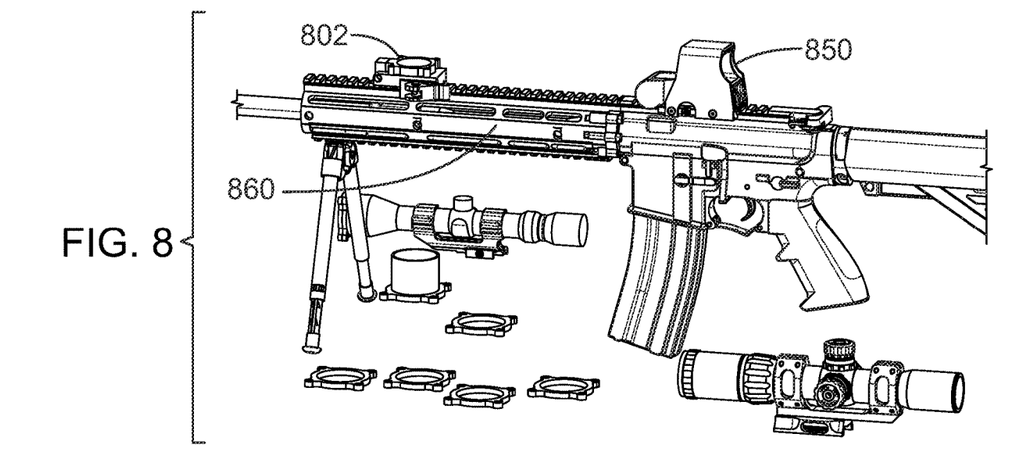
FIG. 8 shows an exemplary embodiment of an optical image adjustment device.
Figure 9:
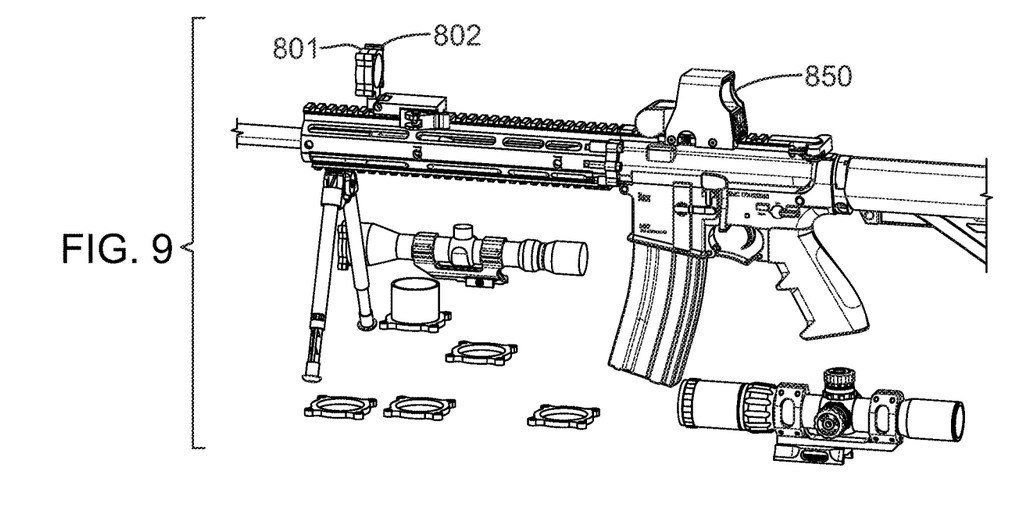
FIG. 9 shows an exemplary embodiment of an optical image adjustment device.

Referring now to exemplary FIGS. 5, 6 and 7, various embodiments of an optical image adjusting device 100 may be shown and described. In these exemplary embodiments, a lens device may be set in front of an existing or primary optic. The existing or primary optic may be any type of optic, for example a scope, a holographic sight, a "red dot", and the like. The lens device may then be used to shift an apparent image position of a viewed target or scene.

In exemplary FIG. 5, a standard lens 500 may be mounted in front of a primary optic 506. As shown in exemplary FIG. 5, light (or image) 503 passing through standard lens 500 can occur across any of a variety of focal lengths and result in aberrations 507, affecting a desired or usable portrayal of an image.

However, in a further exemplary embodiment, and referring now to exemplary FIG. 6, primary optic 606 may take the form of a traditional scope. Primary optic 606 may be mounted on any object, for example a rifle, in any secure fashion, as desired. Optical adjustment device or lens 600 may be mounted, in any secure fashion, as desired, in an area in front of or before primary optic 606. For example, both primary optic 606 and lens 600 may be mounted on a rail or a rifle (not pictured). Additionally, in some other exemplary embodiments, lens 600 may be mounted or coupled directly to primary optic 606.

Still referring to exemplary FIG. 6, lens 600 may be a stacked lens, for example similar to a Fresnel lens or device. In such examples, lens 600 may include multiple sections of a glass wedge that may be stacked vertically on top of one another. In such configurations, a lens 600 formed of stacked sections may be utilized to correct aberrations that may otherwise be created by a standard wedge or prism.

In such exemplary embodiments, light (or image 603) passing through lens 600 may result in a corrected aberration 607 when compared to that in exemplary FIG. 5. Here the corrected aberration 607 may be generated as an angle of a wedge of a lens (e.g. lens 500) increases and/or magnification increases, the generation of aberrations may grow. Thus, as lens 600 has stacked portions, or wedges, a corrected aberration 607 may be provided. Similar to the above exemplary embodiments, such a corrected aberration 607 formed by lens 600 may allow for the shifting of an apparent image position as viewed through primary optic 606. Such image position shifting or improvement may provide significantly enhanced viewing through primary optic 606, such as a standard rifle scope.

In such exemplary embodiments, as shown in FIG. 7, a target image (or image 703) passing through a slit 708 may result in a corrected aberration 707 when compared to that in exemplary FIG. 5. Here the corrected aberration 707 may be generated as an angle of a wedge of a lens (e.g. lens 500) increases and/or magnification increases, the generation of aberrations may grow. Thus, as lens 700 has stacked portions, or wedges, a corrected aberration 707 may be provided. Similar to the above exemplary embodiments, such a corrected aberration 707 formed by slit 708 may allow for the second zero of an apparent image position as viewed through primary optic 706. Such image improvement may provide significantly enhanced viewing through primary optic 706, such as a standard rifle scope.

Figure 10:
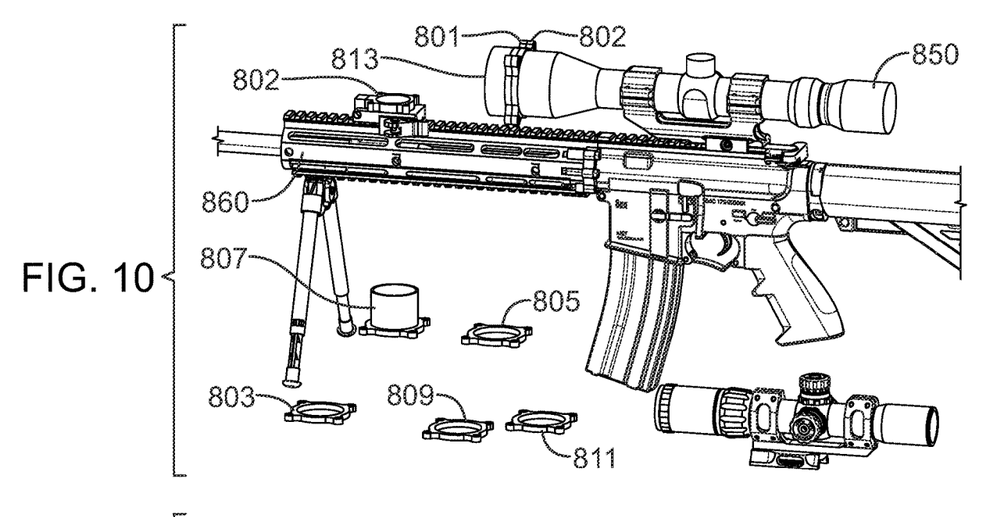
FIG. 10 shows an exemplary embodiment of an optical image adjustment device.
Figure 11:
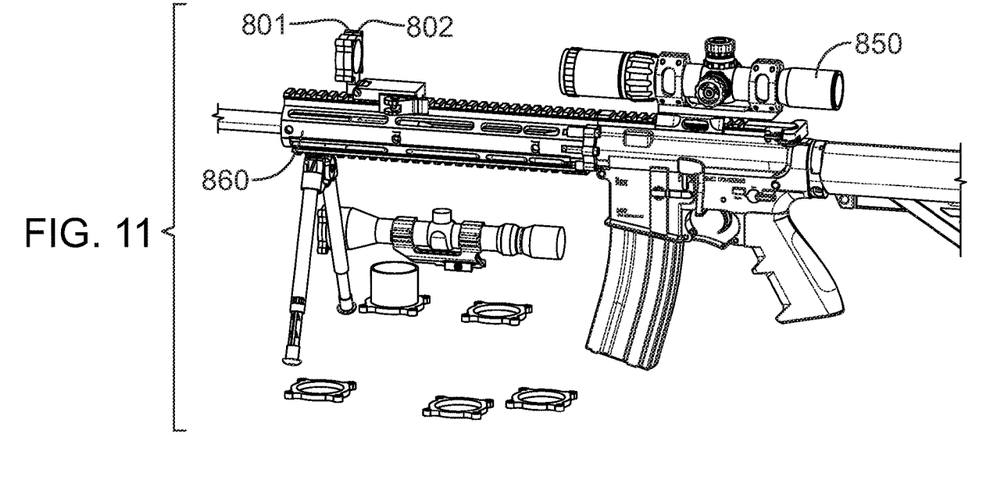
FIG. 11 shows an exemplary embodiment of an optical image adjustment device.
Figure 12:
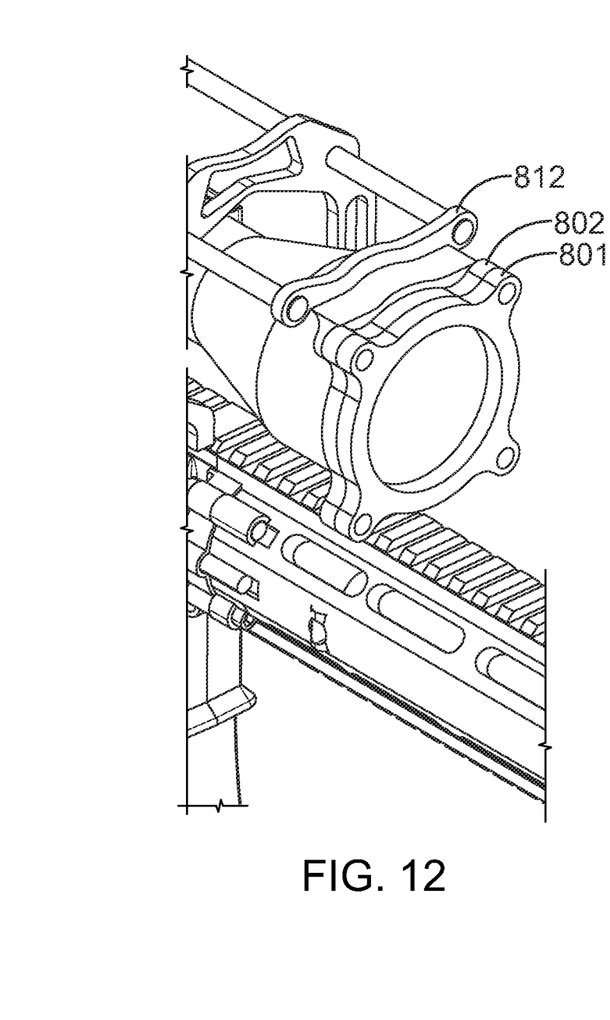
FIG. 12 shows an exemplary embodiment of an optical image adjustment device.
Figure 13:
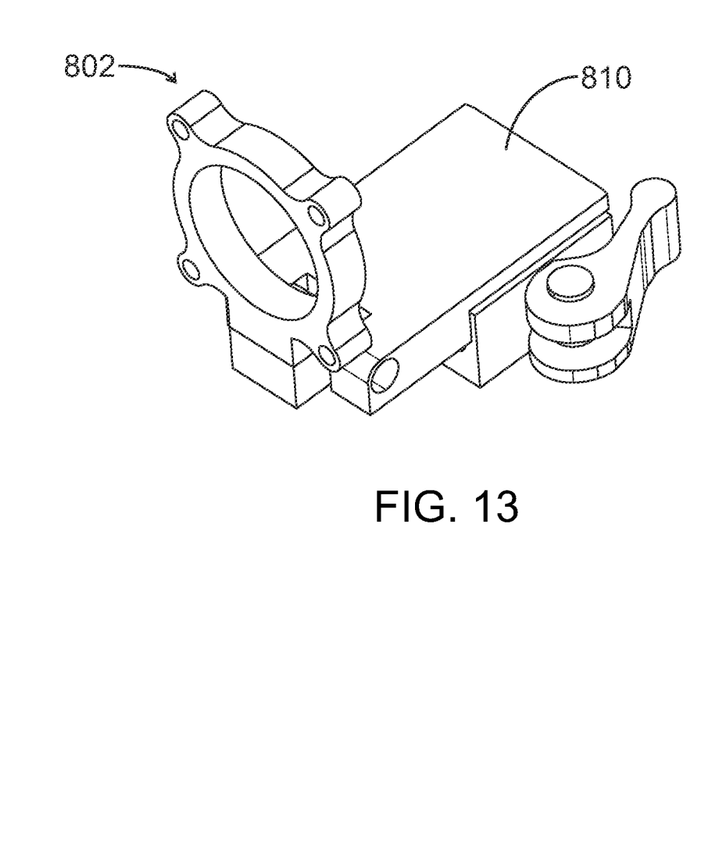
FIG. 13 shows an exemplary embodiment of an optical image adjustment lens support.
Figure 14:
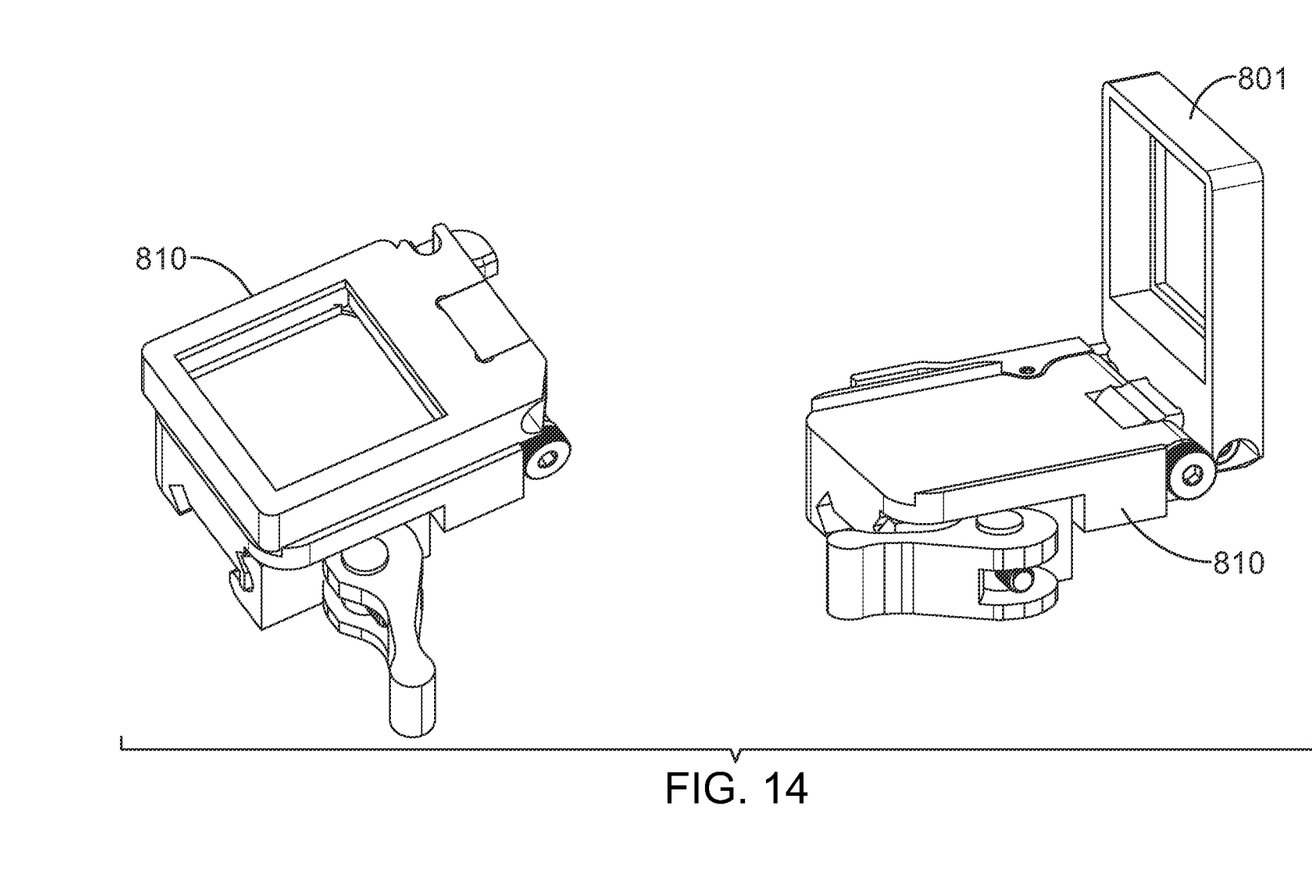
FIG. 14 shows an exemplary embodiment of an optical image adjustment device.

Now referring to exemplary FIGS. 8-14, various exemplary embodiments of an optical adjustment device may be provided. Optical adjustment device may include a support 802. Support 802 may be capable of interchangeably securing an optical adjustment device 800 lens 801 in the line of sight of an existing optical device 850. The support 802 may optionally be secured to the same weapon or object 860 that the existing optical device 850 is secured to, or may optionally be secured directly to the existing optical device, as shown in FIG. 10. In exemplary embodiments where support 802 is secured to an object 860 in line with optical device 850, support 802 may be capable of hingedly flipping up or down in the path of the existing optical device 850. An optical adjustment device lens 801 may be secured to support 802 by magnets, clips, ties, hook and loop type fasteners, screws, bolts, and any other desired fastener as would be understood by a person having ordinary skill in the art. In an exemplary embodiment, support 802 may have substantially the same shape as an optical adjustment lens 801. In addition to supporting a variety of optical adjustment lenses 801, 803, 809, 811 with various optical adjustment properties, support 802 may optionally support interchangeable shades 807, filters 805, covers 813 and other optical device enhancements as would be understood by a person having ordinary skill in the art. When a lens 801 or other device is not secured to support 802, support may optionally not impede an operator's line of sight through an existing optical device 850.

In some exemplary embodiments, where support 802 is mounted to the same object, such as a firearm rail, as an existing optical device, support 802 may include a quick-release or connection component 810 designed for use with that object or rail. In embodiments where support 802 is secured directly to an existing optical device 850, a frame or similar connection component 812 may be used to secure support 802. Finally, in some exemplary embodiments, as shown in exemplary FIG. 14, an optical adjustment lens 801 may optionally be directly affixed to a connection component 810 or 812 and there may be no need for a support 802. In such embodiments, lens 801 may optionally be capable of rotating or moving into and out of the line of sight of an existing optical device.

Now referring to applications of exemplary embodiments, an optical adjustment device may be utilized with a 4-25×-56 mm scope in one exemplary embodiment. It should be appreciated, however, that other variations may be utilized or implemented. In this example, the scope may have an adjustment capability of about 120 minutes of angle (MOA). It may further be appreciated that although MOA may be used in exemplary embodiments herein, the same principles, devices, methods and techniques may be used with respect to milliradians (Mils) and they may be adjusted in any desired increments, for example 2 mil, 3 mil, 5 mil, 7 mil 10 mil, 15 mil, and so forth. According to the present example, different sight-in techniques may be utilized. For example, a 100 yard zero may be obtained and the elevation turrets of the scope may be utilized to their standard limits. Then, utilizing the accompanying device described herein, a 25 MOA additional range may be added. Thus, in the present example, accurate sighting could be made for up to about a 1900 yd shot using desired ammunition, such as 300 Winchester magnum. Then, implementing the described and shown technology, with 25 MOA added, a 2400 yd shot may be realized. It may also be appreciated that such MOA adjustments (as well as zero adjustments) may be made instantly and accurately without any turret adjustment.

In another exemplary embodiment, a scope with 120 MOA turret travel mounted with 80 MOA on a rail allowing a 1100 yd sight-in may be utilized. Here, with the described technology, −25 MOA may be realized, allowing for a second zero of 50 yds. In still another exemplary embodiment, the same lens could be inverted adding 25 MOA with the embodiments described herein, allowing for accurate sighting and targeting in a range of up to about 2900 yds, significantly improving the capabilities of the standard scope. Still other scopes could have a range of up to or more than 3000 yds, plus the reticle.

In another exemplary embodiment, for example using an AR-15 rifle platform, or the like, the rifle may be set up for close quarters combat using an EOTech, red dot, ACOG, holographic, or low power scope without longer range capabilities. However, adding the present lens technology can allow for the near instantaneous and fast application of an about 400 yd second zero in elevation. For example, by adding a lens (or other optic device) that shifts a 400 yd target's image to a height constant that may be unique to a round's ballistics, when a shooter raises the AR-15 (or other rifle platform, as desired) to reacquire an adjusted target in their reticle, the target image will be automatically adjusted and compensated for that round's ballistics at 400 yds. This can be done without any guessing, calculation, or adjustment by the shooter.

In still another exemplary embodiment, a 1-6×24 mm AR-style scope may be modified with the present technology. Such a modification may allow the effective range of the scope to be increased from 400 yds to 1000 yds without the need to significantly change the platform hardware.

In yet another exemplary embodiment, a hunter may use a 3-9× scope may have a first zero of 100 yds. With the utilization of the optical adjustment device, a second zero may be created at 310 yds. The creation of the second zero allows a shooter to aim without having to compensate or hold the reticle or dot over or above the target. The shooter can instead place the reticle or dot directly on point of aim. The second zero concept may be applied multiple times, which may allow a shooter multiple direct holds on their target. The compensation may be applied in MOA/MIL specific shifts, round/ballistic shifts, point blank range applications, kill zones, target zones and other incremented applications as would be understood by a person having ordinary skill in the art.

According to another exemplary embodiment, an air soft gun, pellet gun, or BB gun may have a 2-6× scope with a first zero of 20 yds. Utilizing the optical adjustment device, a second zero may be created at 40 yds such that the shooter will not have to compensate or hold the reticle or dot above the target. The shooter can instead place the reticle or dot directly on the point of aim. The second zero concept can be applied multiple times, allowing the shooter multiple direct holds on their target. The compensation may be applied in MOA/MIL specific shifts, round/ballistic shifts, point blank range applications, kill zones, target zones and other incremented applications as would be understood by a person having ordinary skill in the art.

According to still another exemplary application, a paint ball shooter may use a 1× scope having a first zero of 20 yds. The shooter may utilize the optical adjustment device to create a second zero at 40 yds. This may allow the shooter to place the reticle or dot directly on the point of aim rather than compensating or holding the reticle or dot above the target. The second zero concept can be applied multiple times, allowing the shooter multiple direct holds on their target. The compensation may be applied in MOA/MIL specific shifts, round/ballistic shifts, point blank range applications, kill zones, target zones and other incremented applications as would be understood by a person having ordinary skill in the art.

In another exemplary application, a pistol shooter may have a 1× scope or micro dot with a first zero of 20 yds. The shooter may utilize the optical adjustment device to create a second zero at 100 yds. This may allow the shooter to place the reticle or dot directly on the point of aim rather than compensating or holding the reticle or dot above the target. The second zero concept can be applied multiple times, allowing the shooter multiple direct holds on their target. The compensation may be applied in MOA/MIL specific shifts, round/ballistic shifts, point blank range applications, kill zones, target zones and other incremented applications as would be understood by a person having ordinary skill in the art.

In another exemplary application, a short range device such as a shot gun or cross bow shooter may have a pin, micro dot, or iron sight with a first zero of 20 yds. The shooter may utilize the optical adjustment device to create a second zero at 50 yds or even 150 yds depending on the ballistic requirements of the projectile.

In another exemplary application, a rapid fire device such as a Gatling gun or M2 "Ma Deuce" machine gun may have an optic, pin, micro dot, or iron sight with a first zero of 200 yds. The shooter may utilize the optical adjustment device to create a second zero at 1000 yds allowing rapid accurate mass fire on a target at extended ranges.

The above weapons, scopes, magnifications, ranges and adjustments by the optical adjustment device in the above applications are for exemplary purposes and it may be understood by a person having ordinary skill in the art that a variety of weapons, scopes, magnifications, ranges and adjustments may be utilized and achieved.

The foregoing description and accompanying drawings illustrate the principles, preferred embodiments and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:
1. An optical adjustment device comprising:
a lens device; and
a support configured to selectively position the lens device within a line of sight of a primary optic of a weapon, wherein:
the weapon is configured to fire a projectile;
the primary optic is configured to indicate a point of impact upon a target viewed through the primary optic;
the lens device is configured to bend a line of sight of the primary optic when positioned within the line of sight of the primary optic, and the lens device comprises a single or exactly one prism,
the support is configured to secure the lens device to one of the primary optic or the weapon via a hinge configured to selectively position the lens device within the line of sight of the primary optic and out of the line of sight of the primary optic,
wherein a first zero corresponds to a first range at which the projectile fired from the weapon hits the target with an aiming point aligned with the image of the target viewed through the primary optic, and a second zero corresponds to a second range at which the projectile hits the target with the aiming point aligned with the image of the target viewed through the primary optic and the lens device, wherein:
the first zero is different from the second zero;
the first range is different from the second range; and
the aiming point of the weapon cannot be aligned with the image of the target viewed through the primary optic without the lens device in in the line of sight of the primary optic.

2. The optical adjustment device of claim 1, wherein the lens device is a light bending body.

3. The optical adjustment device of claim 1, wherein the lens device does not comprise a pair of prisms.

4. The optical adjustment device of claim 1, wherein the lens device is a prism, and the prism is the only prism of the lens device.

5. The optical adjustment device of claim 1, further comprising:
the weapon; and
the primary optic.

6. The optical adjustment device of claim 1, wherein:
the lens device comprises a prism;
when the lens device is positioned within the line of sight of the primary optic of the weapon and the weapon is upright and level, the prism is thicker at a bottom of the prism than at a top of the prism such that the line of sight of the primary optic is bent downward.

7. The optical adjustment device of claim 1, wherein:
the lens device comprises a prism;
when the lens device is positioned within the line of sight of the primary optic of the weapon and the weapon is upright and level, the prism is thicker at a top of the prism than at a bottom of the prism such that the line of sight of the primary optic is bent upward.

8. The optical adjustment device of claim 1, wherein:
the lens device comprises a prism;
when the lens device is positioned within the line of sight of the primary optic of the weapon and the weapon is upright and level, the prism is thicker at a bottom of the prism than at a top of the prism such that the line of sight of the primary optic is bent downward; and
in a flipped orientation, when the lens device is positioned within the line of sight of the primary optic of the weapon and the weapon is upright and level, the prism is thicker at the top of the prism than at the bottom of the prism such that the line of sight of the primary optic is bent upward.

9. The optical adjustment device of claim 1, wherein:
when the lens device is positioned within the line of sight of the primary optic of the weapon and the weapon is upright and level, an angle of a wedge of the lens device bends a line of sight of the primary optic downward.

10. The optical adjustment device of claim 1, wherein:
when the lens device is positioned within the line of sight of the primary optic of the weapon and the weapon is upright and level, an angle of a wedge of the lens device bends a line of sight of the primary optic upward.

11. The optical adjustment device of claim 1, wherein:
when the lens device is positioned within the line of sight of the primary optic of the weapon and the weapon is upright and level, an angle of a wedge of the lens device bends a line of sight of the primary optic downward; and
when the lens device is positioned within the line of sight of the primary optic of the weapon in a flipped orientation and the weapon is upright and level, an angle of a wedge of the lens device bends a line of sight of the primary optic upward.

12. The optical adjustment device of claim 1, wherein:
when the lens device is positioned within the line of sight of the primary optic of the weapon, the lens device adjusts an angle of a line of sight of the primary optic by a predetermined quantity of minutes of angle.

13. The optical adjustment device of claim 1, wherein a first zero corresponds to a first range at which the projectile fired from the weapon hits the target with an aiming point of the primary optic aligned with the point of impact viewed through the primary optic, and a second zero corresponds to a second range at which the projectile hits the target with the aiming point of the primary optic aligned with the point of impact viewed through the primary optic and the lens device, wherein the first zero is different from the second zero, and the first range is different from the second range.

14. The optical adjustment device of claim 1, wherein:
the lens device is external to the primary optic; and
the device further comprises the primary optic.

15. An optical adjustment device comprising:
a lens device; and
a support configured to selectively position the lens device within a line of sight of a primary optic of a weapon by hingedly securing the lens device to one of the weapon or the primary optic, wherein:
the weapon is configured to fire a projectile;
the primary optic is configured to indicate a point of impact upon a target viewed through the primary optic;
the lens device is configured to bend a line of sight of the primary optic when positioned within the line of sight of the primary optic;
the lens device comprises a single or exactly one prism;
when the lens device is positioned within the line of sight of the primary optic of the weapon and the weapon is upright and level, the prism is thicker at a bottom of the prism than at a top of the prism such that the line of sight of the primary optic is bent downward; and
a first zero corresponds to a first range at which the projectile fired from the weapon hits the target with an aiming point aligned with the image of the target viewed through the primary optic, and a second zero corresponds to a second range at which the projectile hits the target with the aiming point aligned with the image of the target viewed through the primary optic and the lens device, wherein:
the first zero is different from the second zero, and
the first range is different from the second range.

* * * * *